(12) United States Patent
Eide

(10) Patent No.: US 9,328,942 B1
(45) Date of Patent: *May 3, 2016

(54) SOLAR PANEL RACKING SYSTEM

(71) Applicant: Kristian Eide, Avon, CO (US)

(72) Inventor: Kristian Eide, Avon, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/171,692

(22) Filed: Feb. 3, 2014

Related U.S. Application Data

(63) Continuation of application No. 13/189,462, filed on Jul. 22, 2011, now Pat. No. 8,661,747.

(60) Provisional application No. 61/400,208, filed on Jul. 23, 2010.

(51) Int. Cl.
| | |
|---|---|
| *E04D 13/18* | (2014.01) |
| *F24J 2/52* | (2006.01) |
| *H01L 31/042* | (2014.01) |
| *E04H 12/18* | (2006.01) |
| *E04B 7/22* | (2006.01) |
| *F24J 2/46* | (2006.01) |

(52) U.S. Cl.
CPC ............... *F24J 2/5245* (2013.01); *F24J 2/5233* (2013.01); *H01L 31/0422* (2013.01); *E04B 7/22* (2013.01); *E04H 12/18* (2013.01); *F24J 2/46* (2013.01)

(58) Field of Classification Search
CPC ........... E04H 12/18; E04B 7/022; E04B 7/16; E04D 13/00; E04D 13/031; F24J 2/46
USPC ......... 52/745.06, 745.05, 745.13, 173.3, 200, 52/78, 73, 222; 126/623, 621; 136/244, 136/251
See application file for complete search history.

(56) References Cited

U.S. PATENT DOCUMENTS

| | | | | |
|---|---|---|---|---|
| 4,269,173 | A * | 5/1981 | Krueger et al. | 126/634 |
| 5,118,069 | A * | 6/1992 | Muhlethaler | 248/613 |
| 5,125,608 | A * | 6/1992 | McMaster et al. | 248/163.1 |
| 5,143,556 | A * | 9/1992 | Matlin | 136/244 |
| 5,483,773 | A * | 1/1996 | Parisien | 52/73 |
| 5,787,653 | A * | 8/1998 | Sakai et al. | 52/173.3 |
| 6,105,317 | A * | 8/2000 | Tomiuchi et al. | 52/173.3 |
| 6,205,719 | B1 * | 3/2001 | Bruce | 52/147 |
| 7,531,741 | B1 * | 5/2009 | Melton et al. | 136/246 |
| 7,694,466 | B2 * | 4/2010 | Miyamoto et al. | 52/173.3 |
| 7,774,998 | B2 * | 8/2010 | Aschenbrenner | 52/173.3 |
| 7,866,099 | B2 * | 1/2011 | Komamine et al. | 52/173.3 |
| 2003/0201009 | A1 * | 10/2003 | Nakajima et al. | 136/251 |
| 2006/0118163 | A1 * | 6/2006 | Plaisted et al. | 136/251 |
| 2009/0230265 | A1 * | 9/2009 | Newman et al. | 248/229.11 |
| 2009/0282755 | A1 * | 11/2009 | Abbott et al. | 52/173.3 |
| 2010/0065108 | A1 * | 3/2010 | West et al. | 136/251 |
| 2010/0163015 | A1 * | 7/2010 | Potter et al. | 126/600 |
| 2010/0236183 | A1 * | 9/2010 | Cusson et al. | 52/645 |

* cited by examiner

*Primary Examiner* — Phi A
(74) *Attorney, Agent, or Firm* — Thomas M. Freiburger

(57) ABSTRACT

A racking system for photovoltaic solar panels greatly reduces material, weight, labor and system profile as compared to previous mounting systems. Special pedestals are secured to a roof at far larger spacings and fewer number than required in previous systems. The pedestals are configured for efficient and dependable flashing for waterproofing the roof. In assembly the extruded aluminum components are fitted together quickly with efficient and strong connections, with the photovoltaic panels retained in a compact array and fully supported along the length of each panel. The fittings provide for field adjustment of the height of the uprights, helping accommodate uneven roof surfaces, such as flat roofs.

15 Claims, 8 Drawing Sheets

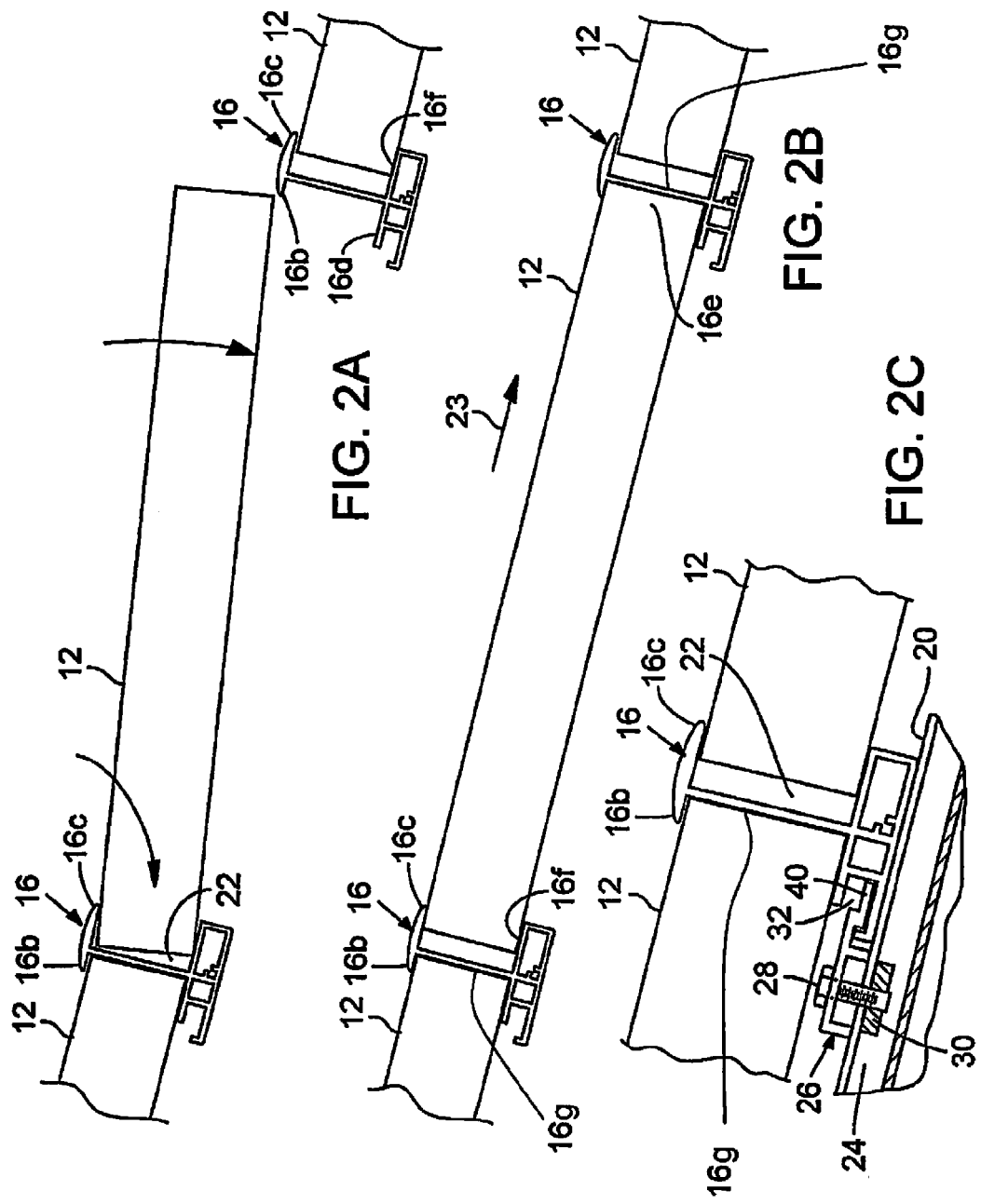

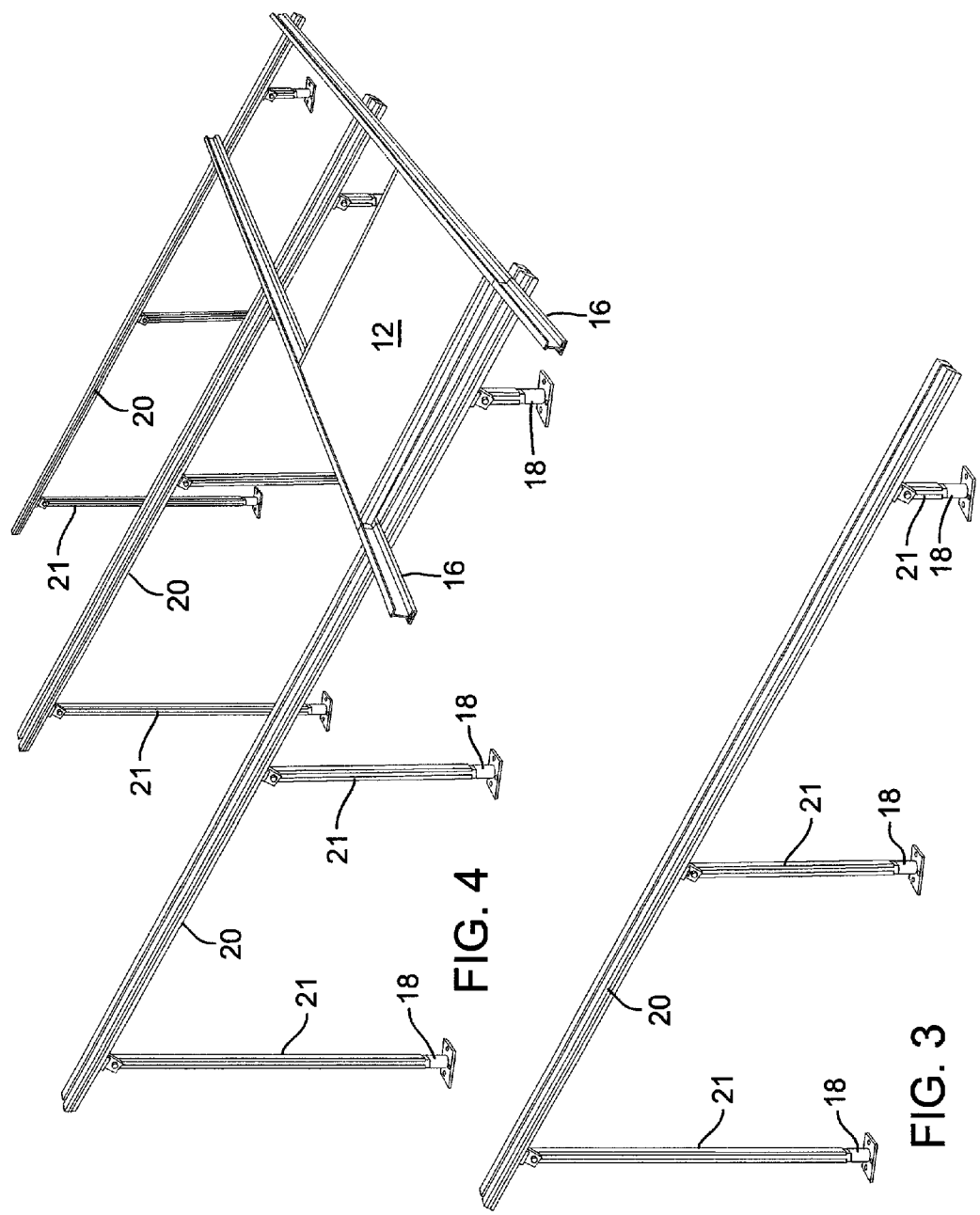

SOLAR PANEL RACKING SYSTEM

This application is a continuation of application Ser. No. 13/189,462, filed Jul. 22, 2011, now U.S. Pat. No. 8,661,747, which claimed Priority from provisional application Ser. No. 61/400,208, filed Jul. 23, 2010.

BACKGROUND OF THE INVENTION

This invention concerns solar collection systems, and particularly a racking or mounting system especially for photovoltaic solar panels, typically roof-mounted but also ground-mounted, in a tilted-up array.

Many different arrangements have been suggested in the literature and used for supporting an array of solar collector panels, either on roof surfaces or ground mounted. Examples are shown in U.S. Pat. Nos. 7,531,741, 4,278,070, 6,105,317 and U.S. Pub. No. 2003/0094193. It is known to use aluminum extrusions for support members and joists or beams in a solar panel racking system.

Prior to this invention solar panel racking systems have employed roof-secured pedestals which are difficult to reliably waterproof, and these roof mountings have been positioned as closely as every four feet. Typically, the systems had a very large number of components to be assembled, as well as great weight in bracing, beams and panel supporting members such as to be difficult and time consuming to assemble, and far heavier than needed, often requiring engineering and roof structural modification to allow the installation, due to the weight of the systems. In addition, the roof connections, where the waterproof roofing was penetrated, were often not reliable or were costly because of the type of flashing that had to be installed. Further, on industrial or commercial flat roofs some variation in roof height is typical, and with past systems the roof elevations often had to be mapped out so that pedestals of appropriate height could be pre-cut before installation.

Conventional racking systems usually employ clips that grip over top edges of the solar panels, and the racking arrangements usually require spaces between adjacent panels in the array, reducing total area available for solar collection.

A principal object of the current invention is to overcome these problems of prior systems, to provide a lightweight but rugged and strong tilt-up solar panel mounting system that is simple, quick to install and with fewer roof penetrations, producing great savings in total weight and labor, as well as avoiding the need for engineering or structural modification on a roof and allowing field-modification of effective pedestal heights.

SUMMARY OF THE INVENTION

The solar panel racking system of the invention, particularly useful with photovoltaic panels, overcomes the problems of prior systems and greatly reduces the cost and weight of an installation. It is estimated that the system can save at least 15% on total installation cost, which includes the cost of the photovoltaic panels themselves, and can reduce cost of racking by up to 70%. The racking system greatly reduces material, labor and system profile as compared to previous mounting systems. Special pedestals are secured to a roof at far larger spacings and fewer number than required in previous systems. The pedestals are configured for efficient and dependable flashing for waterproofing the roof. These pedestals, in an assembly according to the invention, can be at least at five foot spacings and preferably about eight foot spacings or greater horizontally (laterally, parallel to the long dimension of the panels typically east-west direction) and about five foot or greater spacings in the perpendicular (typically north-south) direction. This greater spacing is due to the efficient structural framework above.

In assembly the extruded aluminum components are fitted together quickly with efficient, strong and versatile connections, with the photovoltaic panels retained in a compact array and fully supported along the long sides of each panel, with panel edges fitted into structural east-west oriented channel members. The fittings provide for field adjustment of the height of the uprights, helping accommodate uneven roof surfaces, such as flat roofs.

Structural channel members such as used in the invention have previously been used in Europe to support photovoltaic panels by their edges, but only on roof-plane installations where the panel array follows the roof plane, not in tilt-up arrays. Moreover, this previous use of the structural channels had only the narrow sides of panels supported in the channels, failing to support the photovoltaic panels by their long edges.

It is therefore among the objects of the invention to reduce weight and cost of racking for solar panel mounting, while providing for fast and efficient assembly, reliable roof flashing, fewer roof penetrations and field adjustability of height components. These and other objects, advantages and features of the invention will be apparent from the following description of a preferred embodiment, considered along with the accompanying drawings.

DESCRIPTION OF THE DRAWINGS

FIGS. 2A, 2B and 2C are schematic elevations showing installation of a panel between structural members.

FIG. 3 is a perspective view showing initial erection of components of the racking system.

FIG. 4 is a perspective view with the racking system further assembled.

DESCRIPTION OF PREFERRED EMBODIMENTS

Figure 1:
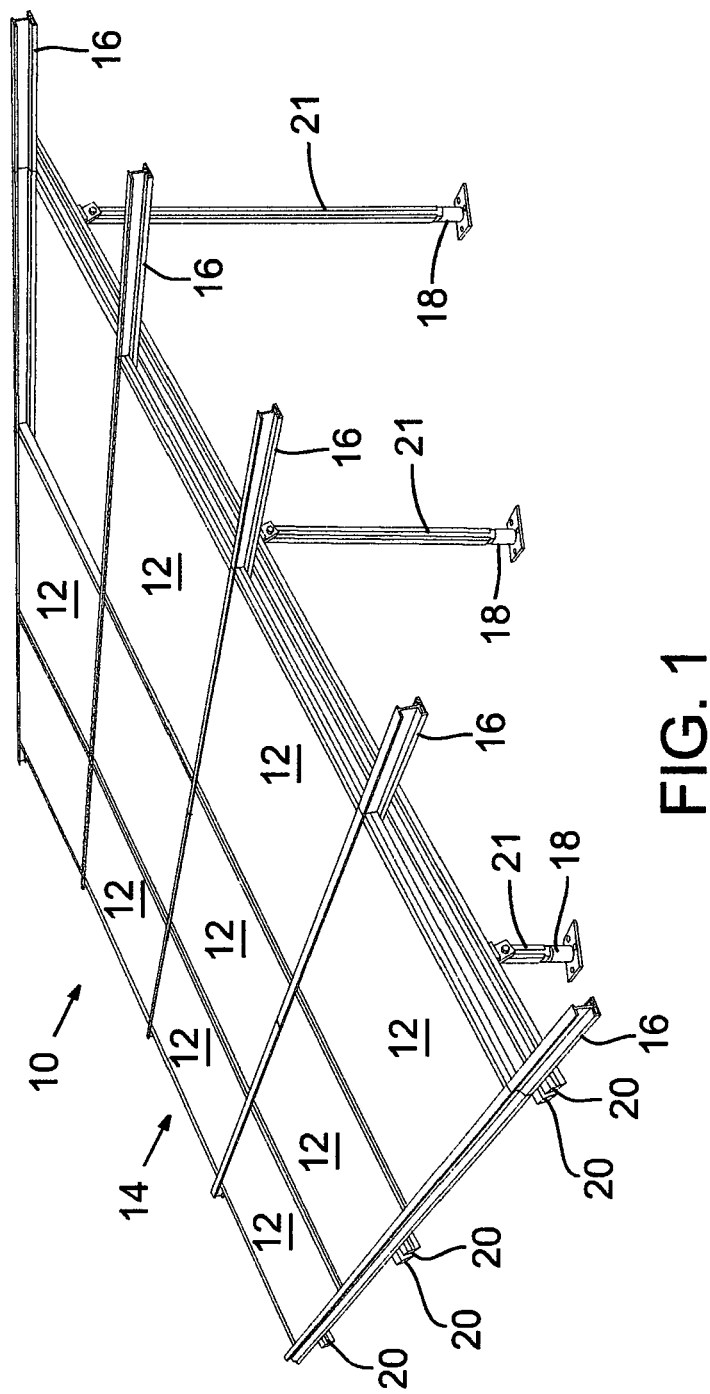
FIG. 1 is a perspective view showing an array of solar panels supported and retained in the racking system of the invention, the system being shown partially constructed.

In the drawings, FIG. 1 shows an example of a tilt-mounted array 10 of rectangular photovoltaic solar collectors 12, in a setup of a racking system 14 comprised primarily of a series of extruded aluminum components in a structural framework. As illustrated, the panels 12 are in a substantially planar grid and arrayed in "landscape" orientation, that is, the long sides of the collector panels in the lateral horizontal direction, sometimes referred to herein as the east-west direction, with the high and low sides of the tilt-up array being north and south, respectively. The use of these directions herein and in the claims is approximate and only for reference, since the north-south directions will be reversed in the southern hemisphere.

Importantly, the panels are structurally supported along the length of their long sides, by horizontal structural frame members or channel members 16 which have channels into which the panels are assembled, which can be by sliding them into place or preferably by a drop-in assembly step, discussed below. This support at the long edges is important and is actually required by at least one major photovoltaic panel manufacturer. The framing channel members preferably are double-sided, although two channels could be used back-to-back if desired, to make the framing channel member 16. Pedestals 18 and legs or uprights 21 are also seen in FIG. 1, but these are better illustrated in other views.

FIGS. 2, 3 and 4 are views indicating the assembly of the array of panels 12 in the racking system 14. FIG. 3 shows assembly of one of a series of main joists 20 onto a series of the legs or support columns 21, each of which is secured to a pedestal 18 (together sometimes referred to as a leg). The pedestals 18 are configured to be secured to a roof, penetrating the waterproof roofing material and being capable of reliable waterproof flashing. They may be used on a flat roof or an inclined roof; in the latter case the pedestals and columns can extend up obliquely, at an angle generally perpendicular to the roof. The pedestals could have angled base plates if desired in some cases if it is important that the loading on the roof at each pedestal be applied generally vertically.

FIG. 4 shows a single solar panel 12 after assembling it into channels of the appropriately spaced panel-supporting framing beams or framing channel members 16. The panels and framing channel members 16 define essentially a first, upper plane, while the series of supporting joists 20 below define essentially a second, lower plane. Note that in FIGS. 1, 3 and 4 the main joists 20 are shown as used singly at outer (east-west) ends of the array, but preferably the main joists 20 are doubled into main joist pairs at all main support lines (north-south lines of support) of the system except the outer locations in the racking system, as shown. They preferably are doubled by connecting one joist to each side of a column 21 (see FIG. 9). The pedestals/columns can thus be at wide spacings, at least about five feet and preferably eight feet or more widthwise, and code requirements will be met, with sufficient joist beam support per length of panels in the array. This minimizes structure in the structural framework and more importantly, greatly reduces the number of legs and roofing penetrations. Greater lateral spacings can be used depending on roof support structure beneath, since greater spans increase point loading. Prior systems typically used four feet spacings laterally. It is noted that reliable, warranted waterproof flashings can cost $100 per roofing penetration.

Figure 5:
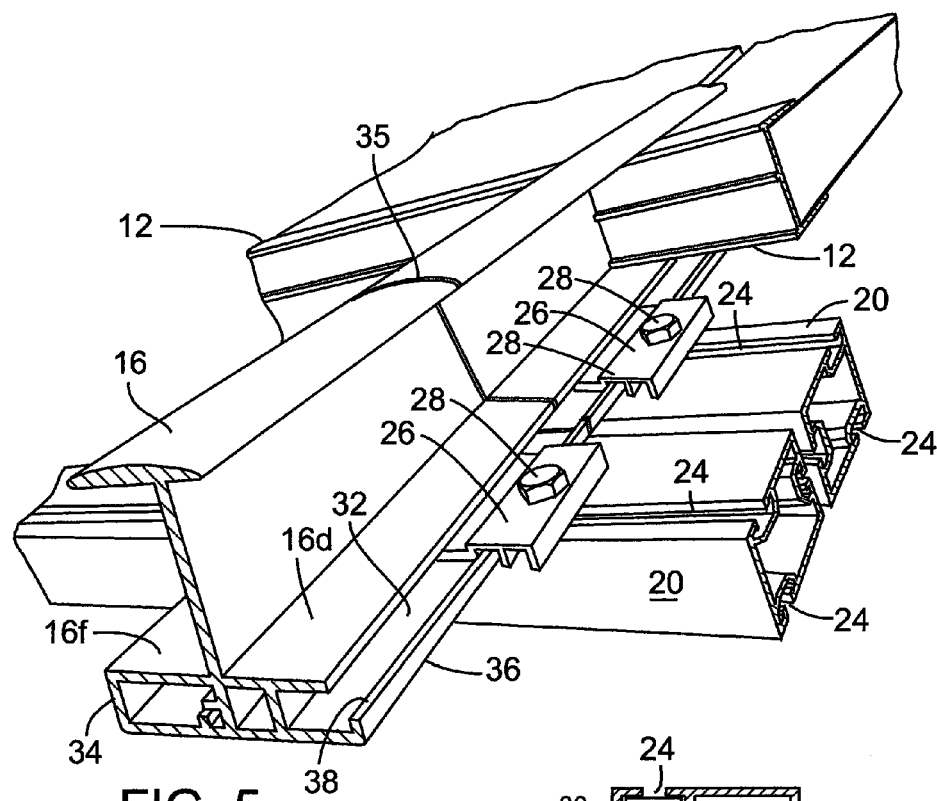
FIG. 5 is a perspective view showing a connection detail whereby panel-engaging structural beam channel members are secured to main, sloping joists.
Figure 6:
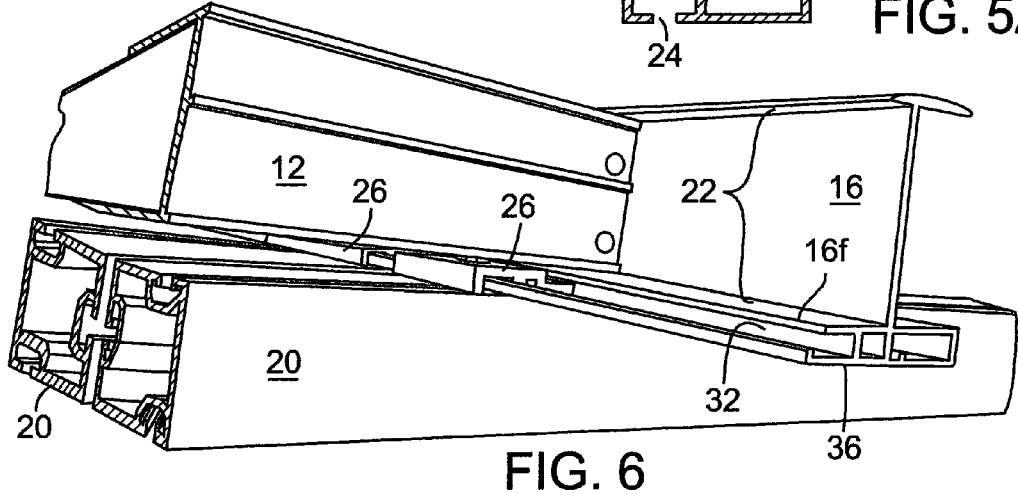
FIG. 6 is another perspective view showing main beams or joists, a panel-engaging structural channel member and a solar panel retained in the structural channel member.

FIGS. 2A-2B show schematically a preferred arrangement for support of the panels 12 between structural framing channel members 16. Preferably these channel members 16 are on lateral lines spaced apart by a distance demonstrated in FIG. 2A, such that when the upper or north side of a panel 12 is fully inserted into the open channel 22 at the south side of a first or north channel member 16 or line of channel members, the south or downhill side of the panel 12 will just clear the upper flange north side 16b of an opposed (south side) channel member 16 or line of channel members. For this purpose the upper flange north side 16b of each channel member is shallower than the upper flange south side 16c, on each channel member. The lower flange north side 16d is deeper than the flange 16b immediately above, so that the side of the panel when lowered will rest on that lower flange 16d. After the panel is lowered, it is moved into place by fully sliding it into the open channel 16e of the channel member, as shown in FIG. 2B and indicated by the arrow 23. The north side of the panel rests on the lower flange south side 16f of the first channel member (north or left in the figures), as shown in FIGS. 2B and 2C, and both the north and south edges of the panel 12 are covered by channel flanges. The panel will not escape, even in windy conditions. FIGS. 2A-2C, as well as FIGS. 4-6, show that the open channels 16e are rectangular, three-sided open channels formed between upper and lower flanges (16b, 16d; 16c, 16f), between which a solid, single-wall web 16g extends, the channels receiving similarly and complementarily shaped rectangular edges of the solar panels. The rectangular panel edges are formed by an edge face and adjacent and perpendicular upper and lower panel surfaces. Panel edges substantially fill the height of the open channels, while allowing for the assembly shown in FIG. 2A.

Figure 5A:
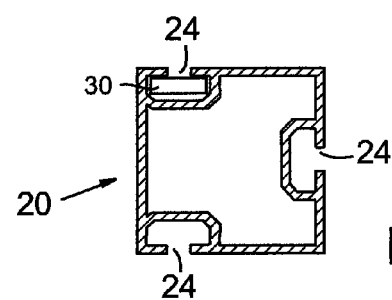
FIG. 5A is an end view or section view showing one preferred configuration of an extruded joist member, as a box beam.
Figure 8:
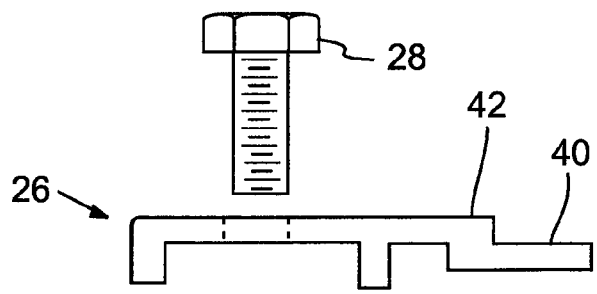
FIG. 8 is a side view showing a connector component.

FIG. 2C shows a preferred method and arrangement for retaining the framing channel members 16 down against the upper surfaces of the main joists 20. This connection is also shown in FIG. 5, a perspective as viewed from the north side of the array. The framing beams 16 are oriented laterally, secured to the main joists 20, which are tilted north-south. FIGS. 2C and 5 also show solar panels 12 retained in channels 22 of the framing beam 16. As noted above, in a preferred racking system the main joists will be doubled at interior positions of the main support lines, as shown in FIG. 5. The main joist 20 is here shown as a box beam, an aluminum extrusion with several nut-capturing channels in its sides, one of which is shown at 24. These channels, which can be shaped generally as shown in FIG. 5A, are locking channels for nuts or threaded plates to receive bolts in order to secure a bracket or clip such as the clip 26 shown in side view in FIG. 8. A machine bolt 28 is inserted through an opening in the clip 26, to engage with a captured channel nut such as shown at 30 in FIG. 5A. Such a channel nut is elongated in one direction and insertable through the slot of the channel 24, then turned to a position where it is locked in place to receive the threaded bolt. It may have a compression spring on its bottom side (as well known) for temporary holding in place. The box beam 20 shown in FIG. 5A is available commercially, or it can be fabricated in a different configuration so long as appropriate connection means is available, such as shaped channels for channel nuts.

Figure 7:
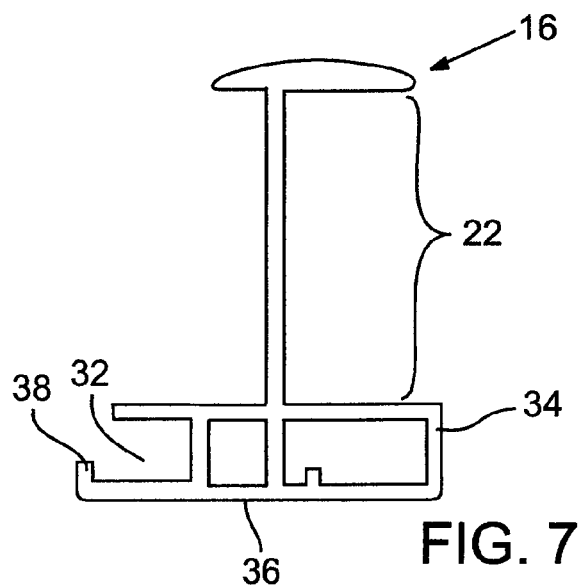
FIG. 7 is a cross section view showing an example of the panel retaining structural channel member.

The clip 26 is shaped to engage with a fastening channel 32 of the framing beam 16. This lower, fastening channel 32 is formed between a second or lower flange 16d of the beam 16 and a bottom flange 36. This bottom flange 36 extends out more widely than the other flanges and preferably includes a locking lip 38. Thus, it can be seen that the fastening clip or bracket 26, which has a tail 40 with a step 42, fits closely in the fastening channel 32 for locking the framing beam 16 in place against the main joist 20. These clips are preferably used on the north sides of the framing channel members 16, for aesthetics. The north, tilted-up side is less visible than the south side of the array, and, as seen in FIGS. 5 and 7, the south side of each channel member 16 can have a closed section or box 34 as shown in the drawings (see FIGS. 5 and 7), for better aesthetics at the south, lower side of the array. Alternatively, the open fastening channel 22 can occur at both north and south sides if desired. The clips 26 could thus be used on either or both opposed sides of the channel beam 16.

FIG. 6 is another view showing a solar panel 12 received in the main channel 22 of the framing channel beam 16. The fastening channel 32 is also illustrated in this view. The main joists, the box beams 20, are also shown. The assembly permits positioning of the solar panels in the channels 22 with clearance from the low profile of the clips 26 and bolts 28; the bolt is below the level of the channel 22.

It should be understood that the box beam 20 could be configured differently if desired. What is important is that these main joists have adequate strength such that the pedestals or roof connections can be widely spaced, such as at least about five feet and preferably about eight feet or more in the lateral direction and at least about five feet in the perpendicular direction of the roof, as well as that the joist have some convenient and accessible form of connection for securing the panel framing channel beam 16 to the joist and for securing the joists to the leg columns and ultimately to the pedestals, as discussed below.

Note also that the doubled joist pairs could be replaced with heavier, equivalent single main joists of equal load capacity (this may require building code exceptions or changes in some jurisdictions). The joist pairs provide an advantage in securing joists such as at 35 in a line of channel members 16; joints are needed in large, wide arrays. The channel beams 16 can be abutted at adjacent ends with the joint 35 between joists 20 at a joist pair, and the joists provide for securement of each channel beam and individually to a joist as shown in FIG. 5. This could also be done with a specially formed single joist, wide enough to make the joint.

Figure 10:
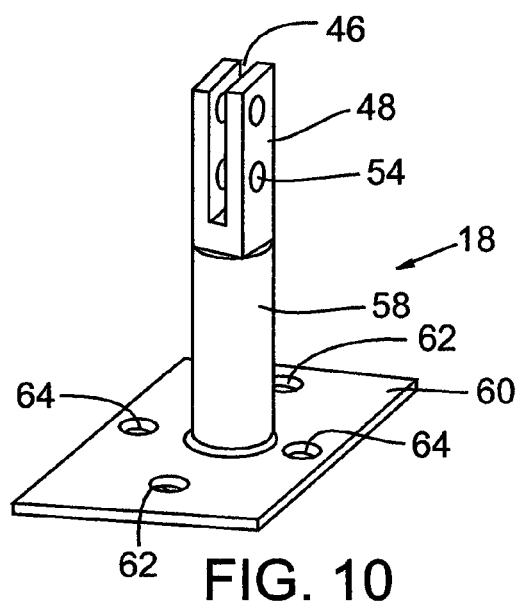
FIG. 10 is a perspective view showing a pedestal for securement down to a roof.
Figure 11:
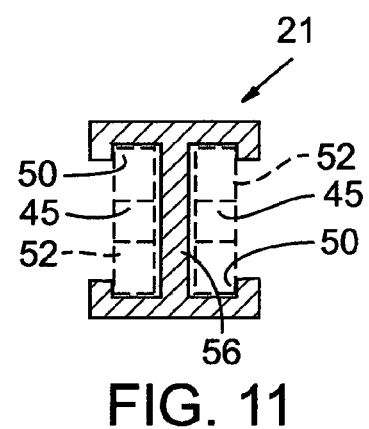
FIG. 11 is a cross section view showing a column or leg member.
Figure 9:
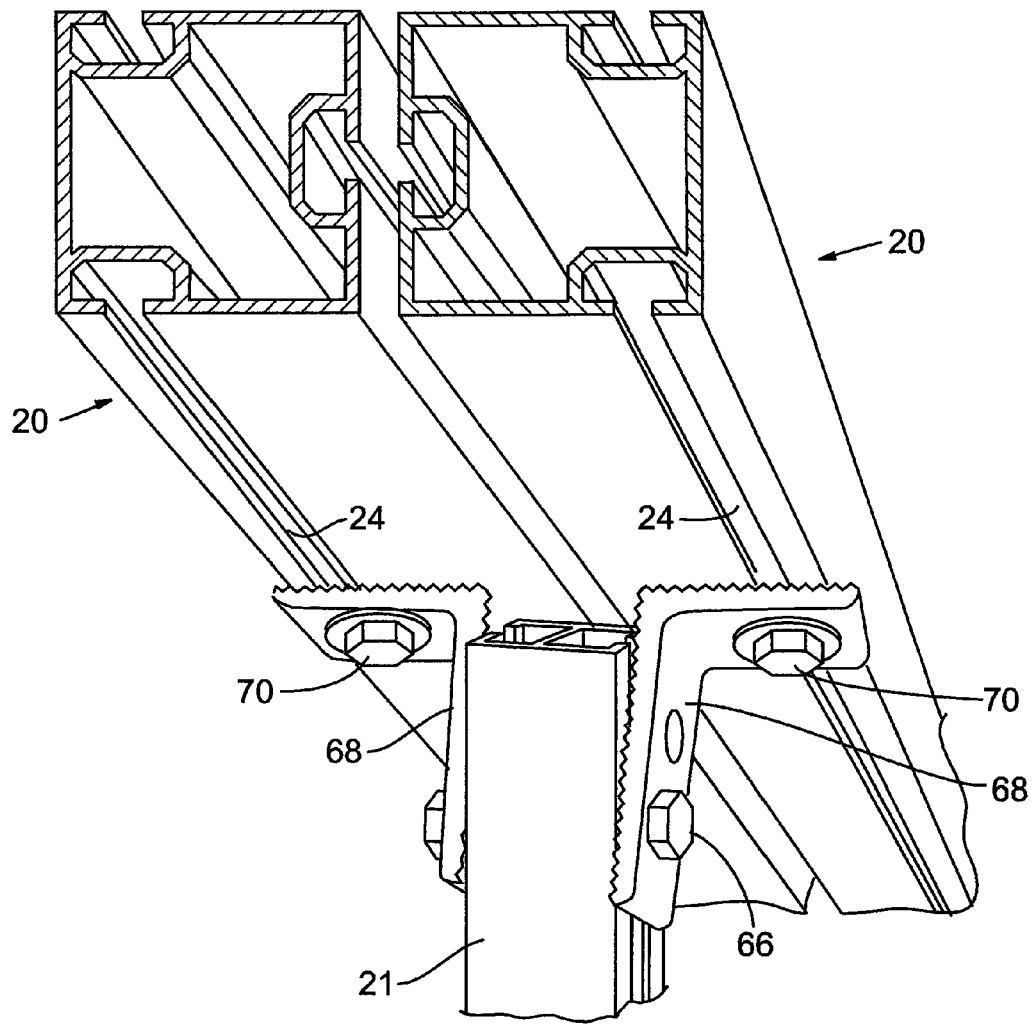
FIG. 9 is a perspective view showing connection of a column or leg to main joists as typical at laterally interior positions in the racking assembly.

FIGS. 9-12 show the column 21 and its connection to the main joist or joists 20. The column or leg 21 may be generally I-beam shaped (H-shaped) in cross section, basically a double "C" back-to-back as shown in FIG. 11. Although this member could be extruded aluminum, it is more preferably galvanized steel for strength and compactness. FIG. 9 shows the preferred double joist (20) arrangement for interior, non-edge positions in the array. Both joists 20 are secured to the leg or column 21 in the manner shown, described below. This leg or upright 21 connects to a custom-formed pedestal 18 of the invention such as shown in FIGS. 10 and 11. The upright has connection channels 45 at its two opposed sides for receiving locking nuts as described above with reference to FIG. 5A (although typically of a larger size), and for connection to the pedestal 18, the pedestal has a slotted upper end, i.e. a vertically extending slot 46 through its middle, as shown for an adequate depth to fully interlock with the column. A top portion 48 of the pedestal is square or rectangular, sized to fit within the confines of the upright leg member 21, between flange ridges 50, as indicated by dashed lines 52 in FIG. 11. The upper portion 48 of the pedestal has holes 54 for bolts to extend through the pedestal and through the central web 56 of the upright leg member 21. In a preferred embodiment the pedestal is machined of aluminum or steel, with a lower portion 58 solid and preferably cylindrical as shown. The bottom end of this cylindrical portion can be connected with machine screws or welded or otherwise secured to a separately formed base plate 60. Typically two aligned holes are used to secure the base plate down to a roof joist or rafter, and it is preferred that two sets of fastener holes 62 and 64 be provided, so that the pedestal can be oriented in either of two perpendicular directions for orienting the generally H-shaped leg or column member 21 as desired for further connections.

The pedestal 18 shown in FIG. 10 is thus convenient and efficient for a connection to roof trusses or rafters, and it can also be used for carrying electrical cables from the array, or for ground mounting of solar panel racking. The same base plate 60, or a base plate modified as desired, can be set on a concrete footing. For that application the bottom portion 58 of the pedestal can be shorter if desired, with no flashing required. Alternatively, a standard UNISTRUT ground mount, capable of receiving the upright 21, could be used in lieu of the custom pedestal 18 of the invention.

The cylindrical exterior of the upright pedestal portion 58 enables effective and reliable flashing in an inexpensive manner, using cone-shaped flashing devices which are available commercially. This portion 58 preferably is about six inches in height, or preferably at least about five inches in height for roof flashing application. This pedestal could take other forms if desired, such as a square or rectangular shape from the upper portion 48 continuing down to the connection with the base plate 60. This will provide four faces for flashing, which can be reliably done but typically at greater expense as compared to the cylindrical version that is reliably flashed with an off-the-shelf flashing device.

Note that the invention enables some field-adjustability of the racking. For example, if a flat roof of a building has height variations, the connection shown in FIG. 9 can be adjusted to accommodate for up to several inches in variation. This is done by selecting the height of the L-shaped bracket(s) (FIG. 9) in its connection to the leg or column 21. If needed a further L-shaped bracket could be available to the installer, with a longer vertical leg, as an alternative. In addition, some adjustment is possible at the bottom of the upright, where it connects to the pedestal 18. This is accomplished by variation in the depth to which the H-shaped upright member is fitted over the top section 48 of the pedestal. Holes through the web 56 of the upright 21 can be drilled on site, then bolts installed.

A further important advantage of the invention is that the connections of the main joists to the legs afford the ability to swing the planar portion of the assembly upwardly (typically lifting the north side), to near-vertical plane arrangement, to enable re-roofing a building. The connections such as shown in FIG. 9, at the bolts 66, can be loosened to slip the lower leg of the L-bracket 68 up and out of the upper end of the column. The lowermost line of connection to the pedestals (south side) can be left in place and the entire panel assembly swung upright away from the north columns, temporarily, for this purpose.

Figure 12:
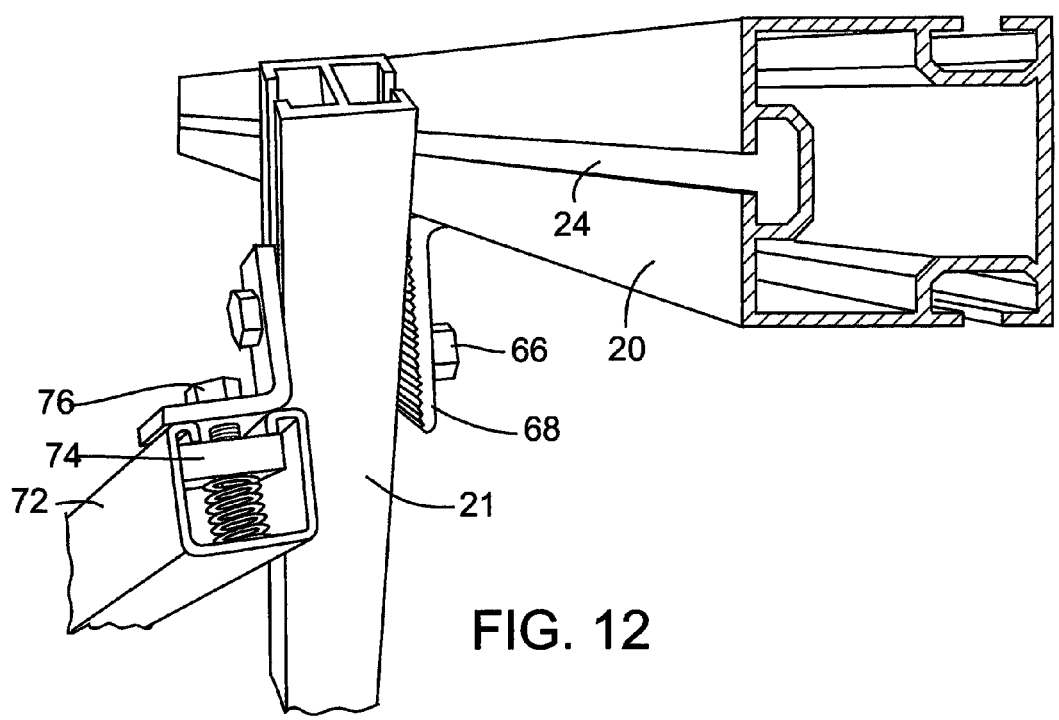
FIG. 12 is a perspective view showing connection of the column member to a main beam and to a bracing member.
Figure 13:
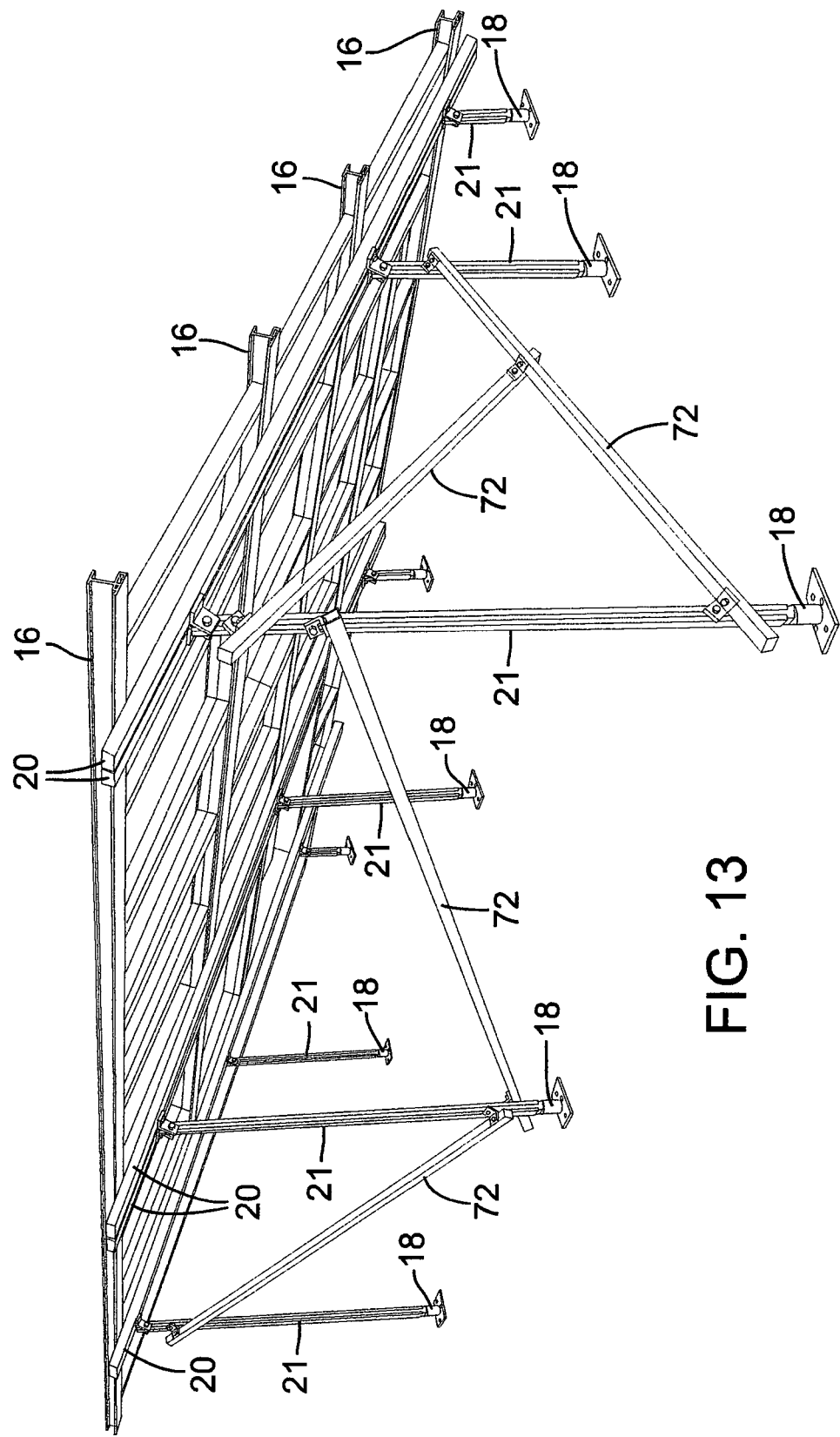
FIG. 13 is a view showing the erected racking system from a rear perspective.

FIGS. 9 and 12 show connections to the upright or column 21. As noted above, an oriented channel nut can be positioned in one of the channels 45 at one of the opposed sides of the upright leg 21. A bolt 66 is shown connecting an L-shaped bracket 68 to the side of the leg 21, the bolt 66 being connected with the locking nut, not shown. In the connection shown, the L-shaped bracket 68 is further connected to a box beam or main joist 20, using a channel 24 in the joist and a bolt 70 (FIG. 9) and a locking nut fitted therein. The joists can be separated by the width of the leg or column 21, held closely against the leg, to afford more stability and reduce lateral load on the L-bracket. FIG. 12 shows a column/main joist connection from a different angle, and this could be at a corner of an array. This view further shows an angled brace 72 (see also FIG. 13) which can comprise a single C-shaped extrusion as shown. This drawing further reveals a locking channel nut 74 engaged inside the C-section brace, receiving a bolt 76. A spring 75 is connected to the nut 74 for positioning.

As noted above, bracing 72 is shown in FIG. 13, and in a system such as shown, is used in both directions. The extrusions described above make convenient the connection of bracing to the uprights or other components where needed. The single C-shaped channels can have slots to receive bolts for this purpose. The cross bracing can be done in other arrangements, depending on wind and seismic loading requirements. For example, the system in FIG. 13, for many applications, could eliminate the braces 72 on the right in the drawing, and the rear braces could occur at some but not all inter-leg spaces.

Some of the off-the-shelf components of the above described assembly are as follows:
- Double-C shaped upright 21: UNISTRUT No. P4101
- Single-C shaped brace 72: UNISTRUT No. P1000 (or P1000SL, with slots for mounting options, if needed)
- L-brackets 68: UNISTRUT P1068
- Channel nuts: UNISTRUT P1010, P4010 (spring can be removed)

The invention is illustrated primarily with photovoltaic solar panels, but the described racking can be used for other solar collector panels as well. The term solar panels in the claims is intended to include such other forms of solar panels.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A method for supporting a plurality of solar panels in a tilted-up array with a north side higher than a south side, in a way to minimize weight, cost, assembly time and number of components, comprising:
   on a building with an essentially flat roof, erecting a series of support legs each with a lower-end base secured to the roof, the legs being arranged in a grid pattern and positioned along main support lines of the grid, and the support legs being of progressively greater length from the south side of the grid to the north side of the grid to establish a tilted up aspect to the array, and the main support lines being at least about five feet apart,
   securing to upper ends of the legs a series of parallel inclined main joists, along the main support lines, so that the main joists extend parallel to one another and in a generally north-south direction and inclined to face generally toward south, the main joists spanning from leg to leg and being unsupported between legs,
   securing on upper sides of the main joists a plurality of framing channel members extending laterally, the framing channel members being at predetermined spacings along the inclined main joists and perpendicular to the main joists, each framing channel member being integrally formed as a single piece and not formed by assembly, the framing channel members having rectangular, three-sided open channels formed by flanges of the framing channel members, the framing channel members being secured to the main joists by bottom flanges of the framing channel members below said open channel, the bottom flanges being in direct contact against the joists and secured to the joists without obstructing the open channels,
   placing solar panels between parallel framing channel members such that laterally extending north and south edges of each panel are fitted into and engaged in open channels of framing channel members, the north and south edges of each solar panel being rectangular in shape, formed by an edge face and upper and lower panel surfaces adjacent and perpendicular to the edge face, the north and south edges being similarly and complementarily shaped to the open channels and substantially filling the height of the open channels of the framing channel members into which they are engaged, such that the north and south solar panel edges are in direct contact with and contained in the complementarily shaped open channels of the framing channel members, such that at least some framing channel members support two opposed solar panels at north and south sides of the framing channel member in back to back said open channels with only a single-wall solid web between the open channels, and such that the solar panels are fully supported and retained against uplift solely by the engagement in the open channels of the framing channel members at north and south ends of the panels,
   and with framing channel members being of length to support the edges of more than one solar panel at aligned north and south panel edges so that uninterrupted framing channel members act as structural beams across spans of support between main joists.

2. The method of claim 1, further including flashing each support leg at the roof for weatherproofing.

3. The method of claim 1, wherein the base at the lower end of each support leg is part of a pedestal, the pedestal having an upright portion extending up from the base, the upright portion having a vertically slotted upper end, and wherein the support leg is H-shaped in cross section including a central web and two flanges, and including assembling the leg to the pedestal by fitting the central web of the leg into the slotted upper end of the upright pedestal.

4. The method of claim 2, wherein the base at the lower end of each support leg is part of a pedestal having an upright portion that includes a cylindrical portion secured to the base, and wherein the step of flashing each support leg includes applying cone-shaped flashing on said cylindrical portion after installing the base, for roof weatherproofing.

5. The method of claim 1, wherein said bottom flanges of the framing channel members are third flanges located at the bottom of the framing channel member below said open channel, and including securing the bottom flange of the framing channel members to the main joists using clips, the clips being secured to the upper sides of the main joists and engaging against the bottom flanges.

6. The method of claim 1, wherein the main joists each comprise an extruded box beam having nut-capturing channels for receiving nuts, for securing the support legs and the framing channel members to the main joists.

7. The method of claim 1, wherein the array of panels is of greater lateral length than the length of a framing channel member, so that joints occur in lines of the framing channel members, with the joints located at main joist lines, and including securing adjacent ends of each of two framing channel members at each said joint to a main joist below.

8. The method of claim 1, further including attaching angle bracing to the legs of the tilted-up array for stability of the tilted-up array.

9. The method of claim 1, wherein the main support lines are set at least eight feet apart.

10. A tilted-up array of solar panels produced in accordance with the method of claim 1.

11. A racking system supporting a plurality of solar panels in a tilted-up array with a north side higher than a south side, the system minimizing weight, cost, assembly time and number of components, comprising:
    a series of support legs each with a lower-end base secured to the roof of a building, the legs being arranged in a grid pattern and positioned along main support lines of the grid, and the support legs being of progressively greater length from the south side of the grid to the north side of the grid to establish a tilted up aspect to the array, and the main support lines being at least about five feet apart, the base at the lower end of each support leg being part of a pedestal, the pedestal having an upright portion extending up from the base, the upright portion having a vertically slotted upper end, and wherein the support leg comprises a main portion H-shaped in cross section including a central web and two flanges, the leg being connected to the pedestal with the central web of the leg fitted into the slotted upper end of the upright pedestal, a series of parallel inclined main joists secured to upper ends of the legs, along the main support lines, the main joists extending parallel to one another and in a generally north-south direction and inclined to face generally toward south, the main joists spanning from leg to leg and being unsupported between legs, a plurality of framing channel members secured to upper sides of the main joists and extending laterally, the framing channel members being at predetermined spacings along the inclined main joists and perpendicular to the main joists, each framing channel member being integrally formed as a single piece and not formed by assembly, the framing channel members having rectangular, three-sided open channels formed by flanges of the framing channel members, the framing channel members being secured to the main joists by bottom flanges of the framing channel members, the bottom flanges being in direct contact against the joists and secured to the joists without obstructing the open channels, solar panels positioned between parallel framing channel members such that laterally extending north and south edges of each panel are fitted into and engaged in open channels of framing channel members, the north and south edges of each solar panel being rectangular in shape, formed by an edge face and upper and lower panel surfaces perpendicular to the edge face, the north and south edges being similarly and complementarily shaped to the open channels of the framing channel members into which they are engaged, such that the north and south solar panel edges are in direct contact with and contained in the complementarily shaped open channels of the framing channel members, and such that the solar panels are fully supported and retained against uplift solely by the engagement in the open channels of the framing channel members at north and south ends of the panels, and with framing channel members being of length to support the edges of more than one solar panel at aligned north and south panel edges so that uninterrupted framing channel members act as structural beams across spans of support between main joists.

12. A racking system supporting a plurality of solar panels in a tilted-up array with a north side higher than a south side, the system minimizing weight, cost, assembly time and number of components, comprising:

a series of support legs each with a lower-end base secured to the roof of a building, the legs being arranged in a grid pattern and positioned along main support lines of the grid, and the support legs being of progressively greater length from the south side of the grid to the north side of the grid to establish a tilted up aspect to the array, and the main support lines being at least about five feet apart, a series of parallel inclined main joists secured to upper ends of the legs, along the main support lines, the main joists extending parallel to one another and in a generally north-south direction and inclined to face generally toward south, the main joists spanning from leg to leg and being unsupported between legs, a plurality of framing channel members secured to upper sides of the main joists and extending laterally, the framing channel members being at predetermined spacings along the inclined main joists and perpendicular to the main joists, each framing channel member being integrally formed as a single piece and not formed by assembly, the framing channel members having rectangular, three-sided open channels formed by flanges of the framing channel members, the framing channel members being secured to the main joists by bottom flanges of the framing channel members, the bottom flanges being in direct contact against the joists and secured to the joists without obstructing the open channels, said bottom flanges of the framing channel members being third flanges located at the bottom of the framing channel member below said open channel, and the bottom flange of the framing channel members being secured to the main joists with clips, the clips being secured to upper sides of the main joists and engaging against the bottom flanges, solar panels positioned between parallel framing channel members such that laterally extending north and south edges of each panel are fitted into and engaged in open channels of framing channel members, the north and south edges of each solar panel being rectangular in shape, formed by an edge face and upper and lower panel surfaces perpendicular to the edge face, the north and south edges being similarly and complementarily shaped to the open channels of the framing channel members into which they are engaged, such that the north and south solar panel edges are in direct contact with and contained in the complementarily shaped open channels of the framing channel members, and such that the solar panels are fully supported and retained against uplift solely by the engagement in the open channels of the framing channel members at north and south ends of the panels, and with framing channel members being of length to support the edges of more than one solar panel at aligned north and south panel edges so that uninterrupted framing channel members act as structural beams across spans of support between main joists.

13. A racking system supporting photovoltaic solar panels in a tilted-up array with a north side higher than a south side, the system minimizing weight, cost, assembly time, system profile and number of components, comprising:

an essentially planar structural framework, tilted up at an acute angle to horizontal so as to generally face toward south, an array of rectangular photovoltaic solar panels, the panels being arranged with edges side by side, the solar panels being secured into, supported by and retained in place by the structural framework, and a series of downwardly extending support legs secured to the structural framework, the legs being spaced apart in the generally east-west direction at least about five feet, the structural framework being formed entirely of (a) framing channel members extending laterally and having open channels within which north and south edges of the panels are received, each framing channel member being integrally formed as a single piece and not formed by assembly, the open channels of the framing channel members being rectangular, three-sided open channels formed by flanges of the framing channel members, with individual channel members extending along the edges of more than one of the side-by-side panels so as to act as structural beams supporting multiple panels across a span, the north and south edges of each solar panel being rectangular in shape, formed by an edge face and upper and lower panel surfaces perpendicular to the edge face, the north and south edges being similarly and complementarily shaped to the open channels of the framing channel members into which they are engaged and substantially filling the height of the open channels, such that the north and south solar panel edges are in direct contact with and contained in the complementarily shaped open channels of the framing channel members, and such that the solar panels are fully supported and retained against uplift solely by the engagement in the open channels of the framing channel members at north and south ends of the panels, the panels and framing channel members defining essentially a first, upper plane, and (b) inclined main joists beneath, directly supporting and secured to the framing channel members, the main joists being along main support lines and extending parallel to one another and in a generally in a north-south direction and inclined to face generally toward south, the main joists spanning from leg to leg and being unsupported between legs, the main joists defining essentially a second, lower plane, said support legs having upper ends secured to the main joists along the main support lines, supporting the structural framework, and wherein the panels are elongated rectangular in shape, with a length end-to-end in the lateral direction greater than a width of the panel, and the framing channel members being generally H-shaped, with an upper flange and a lower flange defining said open channels on each of two opposed north and south sides of the framing channel member, the upper flange being deeper on the south side of the framing channel member than on the north side, and the lower flange on the north side being deeper than the upper flange on the north side, and the framing channel members being spaced apart a predetermined distance such that the panels can be assembled after the framing channel members are secured to the main joists, by first inserting a north edge of a panel into the south side of a framing channel member, then lowering the south edge of the panel onto the lower north side flange of an opposing framing channel member, then sliding the panel down under the north side upper flange of said opposing framing channel member, leaving both north and south edges of the panel covered by flanges of the framing channel members.

14. The racking system of claim 13, wherein the main support lines are at least eight feet apart.

15. The racking system of claim 13, wherein the legs include an upright and a pedestal connected to the upright, and with field adjustability means for adjustable connection of the pedestal to the upright to provide a desired leg length.

\* \* \* \* \*